US011601466B2

(12) United States Patent
Lee

(10) Patent No.: US 11,601,466 B2
(45) Date of Patent: Mar. 7, 2023

(54) IDENTIFYING MALWARE DEVICES WITH DOMAIN NAME SYSTEM (DNS) QUERIES

(71) Applicant: Comcast Cable Communications, LLC, Philadelphia, PA (US)

(72) Inventor: Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 557 days.

(21) Appl. No.: 15/703,072

(22) Filed: Sep. 13, 2017

(65) Prior Publication Data

US 2019/0081958 A1    Mar. 14, 2019

(51) Int. Cl.
| H04L 29/06 | (2006.01) |
| H04L 9/40 | (2022.01) |
| H04L 61/2592 | (2022.01) |
| H04L 61/4511 | (2022.01) |
| H04L 101/622 | (2022.01) |
| H04L 101/659 | (2022.01) |

(52) U.S. Cl.
CPC ........ *H04L 63/145* (2013.01); *H04L 61/2592* (2013.01); *H04L 61/4511* (2022.05); *H04L 63/0209* (2013.01); *H04L 63/0236* (2013.01); *H04L 63/0245* (2013.01); *H04L 63/101* (2013.01); *H04L 2101/622* (2022.05); *H04L 2101/659* (2022.05)

(58) Field of Classification Search
CPC ............... H04L 63/145; H04L 61/1511; H04L 61/2592; H04L 63/0209; H04L 63/0236; H04L 61/6022; H04L 61/6059
USPC ........................................................ 726/12
See application file for complete search history.

(56) References Cited

U.S. PATENT DOCUMENTS

| 2014/0310811 A1* | 10/2014 | Hentunen ............. H04L 61/305 726/23 |
| 2015/0365441 A1* | 12/2015 | Lemon ............... G06F 16/90335 726/1 |
| 2018/0139224 A1* | 5/2018 | Arnell ..................... H04L 41/12 |

OTHER PUBLICATIONS

DNSME Team, "What is DNS Forwarding", Online Blog, Jun. 27, 2013, pp. 1-6, DNS Made Easy News, <social.dnsmadeeasy.com/blog/understanding-dns-forwarding>.
WikiHOW Contributers, "wikiHow to Find a Website's IP Address," Apr. 17, 2008, Online Article, pp. 1-4, WikiHOW, <www.wikihow.com/Find-a-Website%27s-IP-Address>.
Wikipedia Contributers, "DSCP," [Internet] Wikipedia, The Free Encyclopedia, 1 Page, May 18, 2011, <en.wikipedia.org/wiki/DSCP>, last edited Oct. 19, 2016.
Wikipedia Contributers, "Virtual LAN," [Internet] Wikipedia, The Free Encyclopedia, Oct. 8, 2002, pp. 1-9, <en.wikipedia.org/wiki/Virtual_LAN>.
Wikipedia Contributers, "MAC address," [Internet] Wikipedia, The Free Encyclopedia, Dec. 4, 2001, pp. 1-4, <en.wikipedia.org/wiki/MAC_address>.

(Continued)

*Primary Examiner* — Jeffrey C Pwu
*Assistant Examiner* — Nega Woldemariam
(74) *Attorney, Agent, or Firm* — Banner & Witcoff, Ltd.

(57) ABSTRACT

Various examples described herein are directed to identifying a particular computing device, such as a computing device having malware. A DNS query may be received with a token identifying an originating computing device. The DNS query may be compared to a list of domain names associated with particular characteristics, such as having malware. The token may be used to identify the originating computing device and perform further actions.

23 Claims, 7 Drawing Sheets

(56) References Cited

OTHER PUBLICATIONS

Wikipedia Contributers, "IEEE 802.1Q," [Internet] Wikipedia, The Free Encyclopedia, pp. 1-5, Jan. 9, 2005, <en.wikipedia.org/wiki/IEEE_802.1Q>.
Wikipedia Contributers, "Time to live," [Internet] Wikipedia, The Free Encyclopedia, pp. 1-3, Feb. 25, 2002, <en.wikipedia.org/wiki/Time_to_live>.

* cited by examiner

IDENTIFYING MALWARE DEVICES WITH DOMAIN NAME SYSTEM (DNS) QUERIES

BACKGROUND

Computing devices may become infected with malware, such as a virus, that can cause untold trouble in a network. For example, if the computing device is infected with malware, the malware may cause the computing device to transmit an unwarranted number of queries via the Internet. Hackers have been known to use such malware to cause legions of computing devices to flood particular websites with many unwarranted requests, thereby rendering the website servers unable to function properly. This is known as a "denial of service" attack. Such attacks are harmful, and there remains an ever-present need to more effectively identify and remove such instances of malware.

SUMMARY

The following summary is for illustrative purposes only, and is not intended to limit or constrain the detailed description. The following summary merely presents various described aspects in a simplified form as a prelude to the more detailed description provided below.

The present application describes various features that may help to manage user devices, such as, in one aspect, user devices that are infected with malware. In particular, a network device (e.g., a wireless router, gateway, etc.) servicing local user devices may be configured to receive domain name system (DNS) queries from those user devices, and may alter those DNS queries to add information identifying the particular user device that originated the DNS queries. For example, the user-entered text address of "www.destination.com" may be edited to "www.destination.com##userdeviceidentification." A DNS server may determine, via analysis of this modified DNS query, that a user device associated with the DNS query may be infected with malware. The DNS query may be compared against a list of known threat domains. The user device may be identified by, for example, a local address assigned to the user device by the network device. This identification information may be attached to the DNS query. If a DNS query references one of the known threat domains, the user device is identified, a user may be notified of the malware and may be prompted to download anti-virus software. Additionally, the DNS server may instruct the network device to mark subsequent requests from the user device. By processing the marking, upstream computing devices may be able to efficiently redirect requests that may originate at a potentially infected user device. As a result, the user device may also be quarantined from the rest of the network. This may allow for management of malware on a device by device basis as opposed to merely managing batches of user devices.

In additional embodiments, the DNS server may determine that a particular program and/or a user is associated with the infected DNS query. As a result the program and/or the user may be identified by a program identifier (e.g., program name) and/or a user identifier (e.g., a user name) comprising the identification information. This may allow the network device to mark requests from the user device when a certain user is using the user device and/or when a certain program is running on the user device.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is shown by way of example, and is not limited by, the accompanying figures in which like numerals indicate similar elements.

DETAILED DESCRIPTION

In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure.

Figure 1:
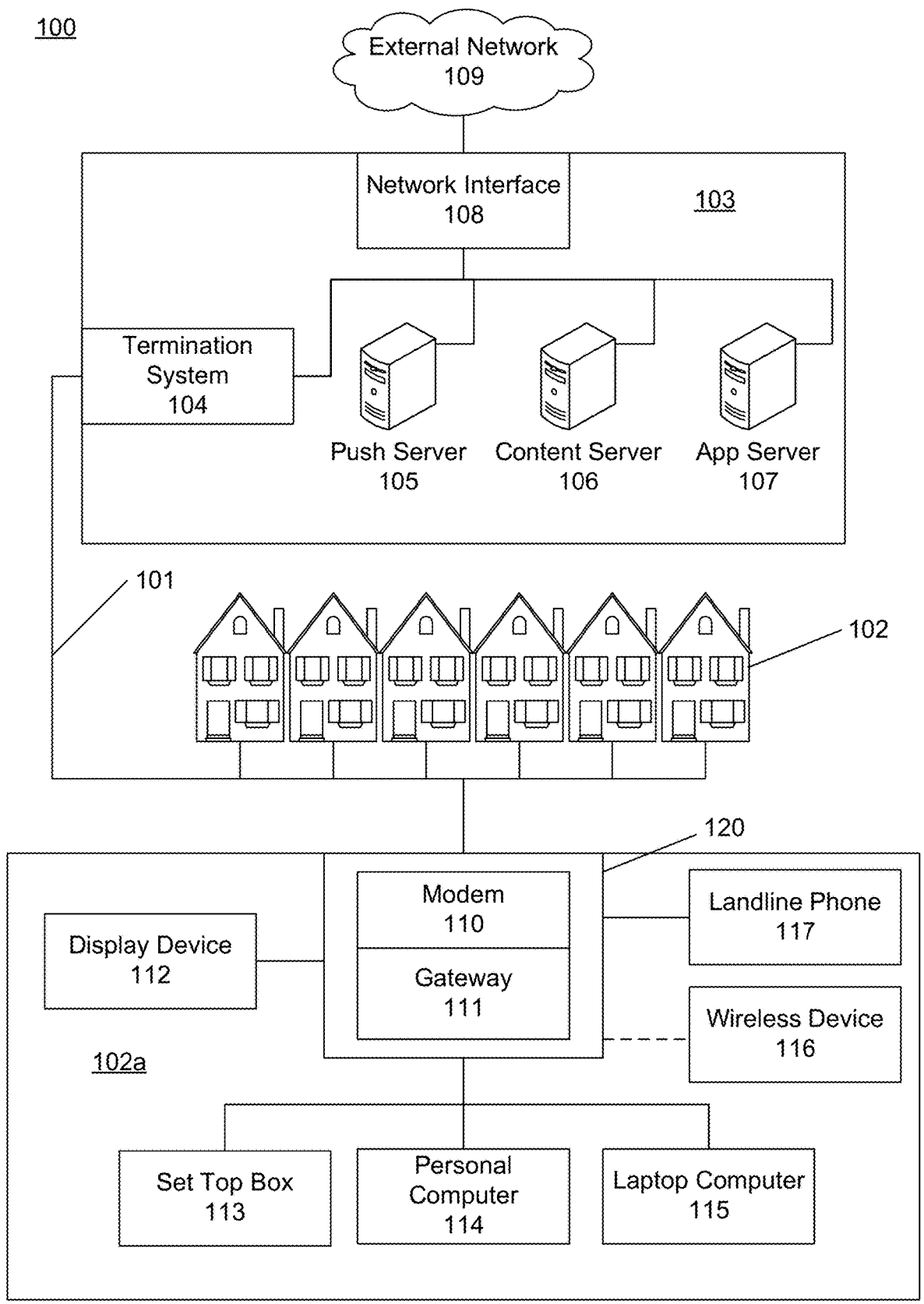
FIG. 1 shows an example communication network on which various features described herein may be implemented.

FIG. 1 shows an example communication network 100 on which many of the various features described herein may be implemented. The network 100 may be any type of information distribution network, such as satellite, telephone, cellular, wireless, etc. The network 100 may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101 and the premises 102 may have receivers used to receive and to process those signals.

There may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of the links 101 and backend devices such as servers 105-07. The interface 104 may be as specified in a standard, such as the Data Over Cable Service Interface Specification (DOCSIS) standard, published by Cable Television Laboratories, Inc. (a.k.a CableLabs), or it may be a similar or modified interface. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. The network interface 108 may include the corresponding circuitry needed to communicate on the external networks 109, and to other devices on the network such as a cellular telephone network and its corresponding cell phones.

As noted above, the local office 103 may include a variety of servers 105-07 that may be configured to perform various functions. The local office 103 may include a push notification server 105. The push notification server 105 may generate push notifications to deliver data or commands to the various premises 102 in the network or to the devices in the premises 102 that are configured to detect such notifications. The local office 103 may also include one or more content servers 106. The content servers 106 may be one or more computing devices that are configured to provide content to users at their premises. This content may be, for example, video content such as video on demand movies or television programs, songs, text listings, or other types of content. The content server 106 may include software to validate user identities and entitlements, to locate, retrieve, and receive requested content, to encrypt the content, and to initiate delivery by streaming of the content to the requesting user or device. The local office 103 may include a load balancer (not illustrated) to route service requests to one of the content servers 106. The load balancer might route the service requests based on utilization or availability of each of the content servers 106.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Redhat, HTML5, JavaScript, AJAX, or COMET. The application server 107 may be responsible for collecting television program listings information and generating a data download for electronic program guide listings. In some aspects of the disclosure, the application server 107 may be responsible for monitoring user viewing habits and collecting that information for use in selecting advertisements. The application server 107 may be responsible for formatting and inserting advertisements in a video stream being transmitted to the premises 102. Although shown separately, one of ordinary skill in the art will appreciate that the push server 105, the content server 106 and the application server 107, may be combined. Further, here the push server 105, content server 106, and application server 107 are shown generally, and it will be understood that they may each contain memory storing computer executable instructions to cause a processor to perform steps described herein or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone-DECT phones, mobile phones, mobile televisions, personal digital assistants (PDA), landline phones 117, which may be Voice over Internet Protocol (VoIP) phones, and any other desired devices. One or more of these devices may transmit a request to the local office 103, such as a domain name system (DNS) request, via gateway interface device 111. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content.

Figure 2:
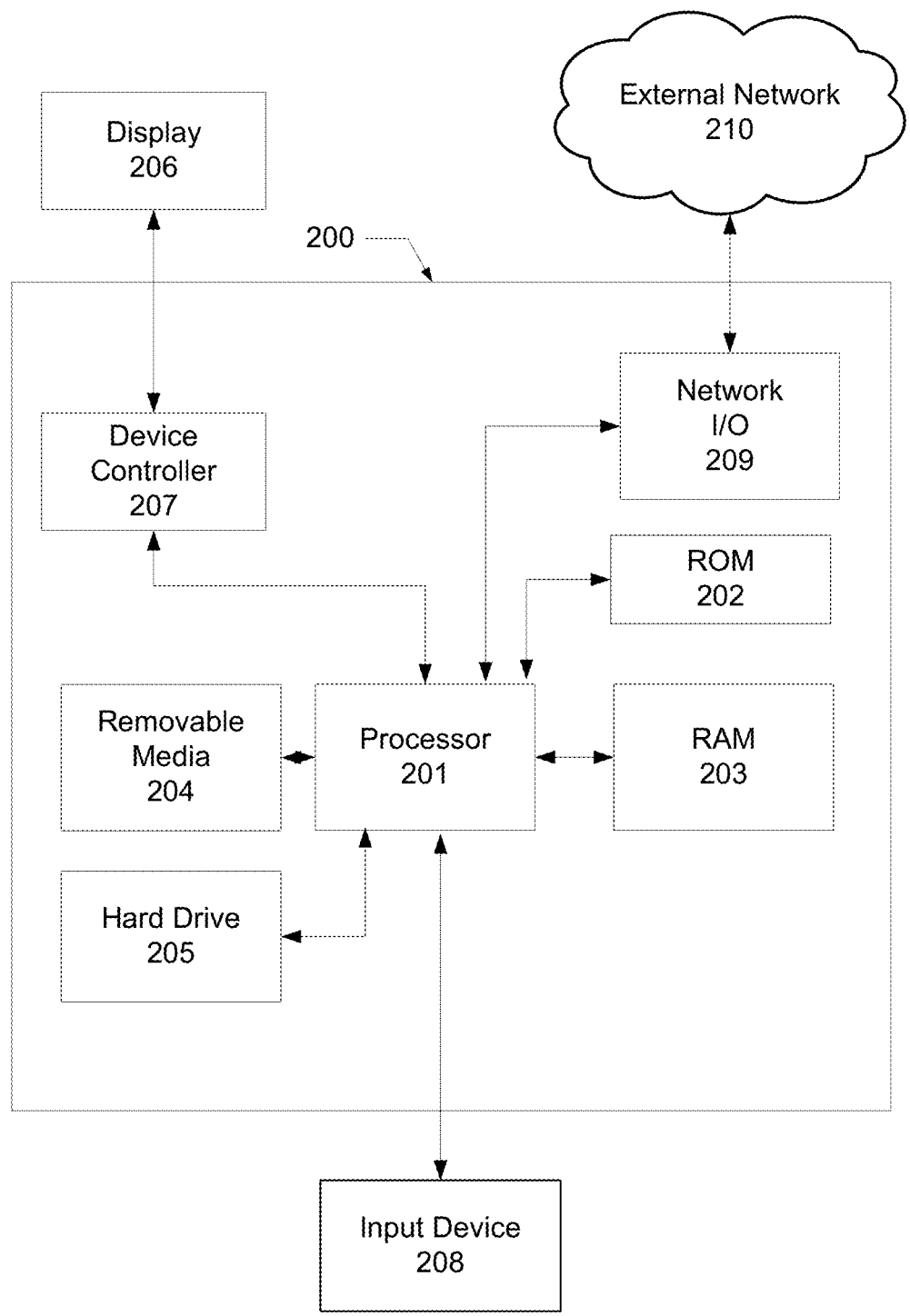
FIG. 2 shows an example computing device that may be used to implement any of the methods described herein.

FIG. 2 shows an example computing device that may be used to implement any of the methods described herein. A computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, a wireless interface, or a combination of the two. The network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 shows a hardware configuration of the device 200, but it should be understood that some or all of the illustrated components may be implemented as software. Modifications may be made to add, to remove, to combine, or to divide components of the computing device 200 as desired. Additionally, the components illustrated may be implemented using basic computing devices and components, and the same components (e.g., a processor 201, a ROM storage 202, a display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices, so that, when executed, the instructions cause the computing devices described herein to perform the various steps and algorithms described. Generally, program modules include routines, programs, objects, components, data structures, etc. that perform particular tasks or implement particular abstract data types if executed by a processor in a computer or other data processing device. The computer executable instructions may be stored on one or more computer readable media such as a hard disk, an optical disk, a removable storage media, a solid state memory, a RAM, etc. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although examples are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

Figure 3:
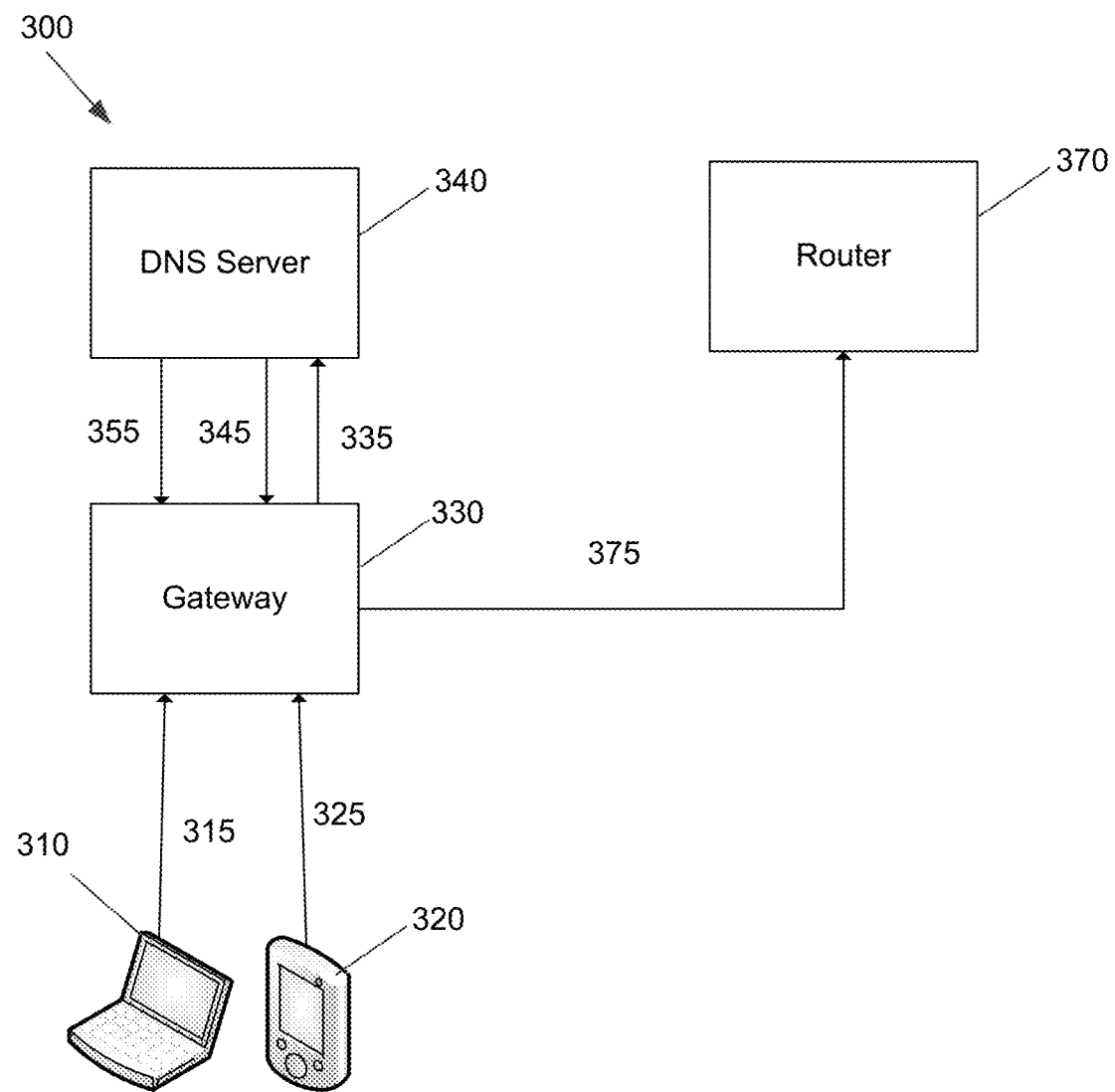
FIG. 3 is a signal flow diagram showing communications between components of an exemplary system according to aspects of the disclosure.

FIG. 3 is a signal flow diagram showing communications between components of an exemplary system 300 according to aspects of the disclosure. A gateway, such as the gateway 330, may be associated with, e.g., in communication with, a plurality of computing devices. The gateway 330 may comprise, for example, a home gateway device. For example, the gateway 330 may comprise the gateway interface device 111, a reference design kit for broadband (RDK-B) based device, or a router. The gateway 330 may comprise a router and/or access point in communication with a laptop computer and a mobile device, such as the laptop computer 310 and the mobile device 320 respectively. The gateway 330 may send and receive transmissions to and from one or more computing devices that are associated with the gateway 330. For example, the gateway 330 may receive a transmission from a display device, a set top box, or a personal computer, such as the display device 112, the set top box 113, and the personal computer 114 respectively. The gateway 330 may comprise a DNS forwarder, for communicating with a DNS server 340. The DNS forwarder may comprise a part of the gateway 330 that handles a particular subset of queries. The particular subset of queries may comprise a specific plurality of external addresses, or a specific plurality of internal addresses. The DNS forwarder may then send the queries on to a DNS server.

The gateway 330 may be associated with a DNS server 340 and/or a router 370, and may be configured to transmit requests between the computing devices 310 and 320, and the DNS server 340 or the router 370. The gateway 330 may transmit a user device token with the requests. The DNS forwarder in the gateway 330 may generate the user device token by combining identification information of the gateway 330 with identification information of the computing device that transmitted the DNS request. For example, the laptop computer 310 may transmit a DNS query 315 to the gateway 330. The DNS forwarder in the gateway 330 may generate a user device token, associated with the laptop computer 310, to be transmitted to the DNS server 340 along with the DNS query via transmission 335.

For example, the user device token may comprise a media access control (MAC)-address and a wide area network (WAN) internet protocol (IP) address associated with the gateway 330, and a user device ID and a local IP address associated with the laptop computer 310 or the mobile device 320. The DNS forwarder may append the user device token to the DNS query, and transmit the user device token and the DNS query to the DNS server 340. Actions performed by the gateway 330 are further described below with regards to FIG. 4.

The DNS server 340 may receive the transmission 335 from the gateway 330, and may respond, to the gateway 330, via the transmission 345. The DNS server 340 may comprise a DNS policy manager, which may comprise a logical component that can coexist in the DNS server 340. The DNS policy manager may filter the transmission 335 based on DNS filter policy and the user device token. Based on the DNS filter policy, the DNS policy manager may determine if a threat analyzer should analyze the DNS query. The DNS filter policy may comprise a set of rules that apply to queries associated with different user device tokens. The DNS filter policy may indicate that the threat analyzer should analyze DNS queries associated with the user device token. For example, the threat analyzer may comprise a list of blacklist domains that may be known to be suspicious, and may examine incoming requests to identify requests originating from, or destined to, any blacklisted domains. The threat analyzer may comprise a database stored on the DNS server 340, or an offline element. The threat analyzer may gather DNS data from the network to analyze and detect possible threats. For example, the threat analyzer may save information, associated with different user device tokens, determined through previous analysis, such as a determination that a DNS query was destined to a blacklisted domain. Actions performed by the DNS server 340 are further described below with regards to FIG. 5.

The threat analyzer may identify the gateway 330 and/or the computing device that transmitted the DNS query, comprising the transmission 335, by analyzing the user device token. For example, the threat analyzer may determine, based on the DNS query and the user device token, received from the gateway 330, that the mobile device 320 previously transmitted another DNS query 325 that comprised a known threat domain, and that the mobile device 320 may be compromised.

The threat analyzer may maintain a list of known threat domains. A known threat domain may comprise a website associated with malware. For example, a known threat domain may comprise a server with which malware is configured to communicate in order to obtain instructions. These instructions may comprise instructions to obtain an address that is to be the subject of a denial of service attack. The threat analyzer may compile the list based on data from multiple clearing houses, which assemble lists of known threat domains. The threat analyzer may also compile the list of known threat domains based on prior DNS queries received at the threat analyzer. The threat analyzer may compare the DNS query, comprising the transmission 335, against the list of known threat domains, and may determine whether the DNS query comprises a request to resolve a known threat domain. For example, the domain DNS query, comprising the transmission 335, may comprise a blacklisted domain. The threat analyzer may inform a policy enforcement manager, and may instruct the policy enforcement manager to apply traffic policy. The threat analyzer may instruct the policy enforcement manager to apply traffic policy to packets traveling from the specific computing device associated with the user device token that comprises the transmission 335. If the DNS query, comprising the transmission 335, is determined to be associated with a known threat domain, the threat analyzer may inform the policy enforcement manager.

The DNS server 340 may comprise the policy enforcement manager. As such, the policy enforcement manager may have access to information determined by the threat analyzer. For example, the policy enforcement manager may have access to a stored listing of domains that the threat analyzer previously deemed suspicious, and a second stored listing of user device tokens associated with DNS queries for the domains. The policy enforcement manager may generate a packet ID. The gateway 330 may mark subsequent requests from a computing device deemed potentially suspicious. By marking the subsequent requests from the computing device, the gateway 330 may facilitate an easy rerouting of the subsequent requests by an upstream router. For example, by determining that the subsequent requests are marked with the packet ID, the upstream router may not need to re-analyze requests, from computing devices deemed potentially suspicious, by comparing a query comprising the request to a blacklist or by analyzing the user device token associated with the request. Implementation of the packet ID may help to reduce computing power needed to reroute the subsequent requests or quarantine a computing device deemed potentially suspicious. The policy enforcement manager may assign the packet ID to the user device token and/or the computing device (e.g., the laptop computer 310) that originally transmitted the DNS query comprising the transmission 335. For example, the policy enforcement manager may generate a packet ID associated with the laptop computer 310 or the mobile device 320. The DNS server 340 may transmit the packet ID to the gateway 330 via a transmission 355. The packet ID may comprise a virtual local area network (VLAN) tag, a differentiated services code point (DSCP) marking, an IPv6 Flow Label and/or an IP encapsulation (Encap) header. For example, if the laptop computer 310 transmits a DNS query for a known threat domain, the DNS server 340 may transmit, to the gateway 330, a packet ID corresponding to the laptop computer 310 and generated by the policy enforcement manager. The DNS server 340 may instruct, via the transmission 355, the gateway 330 to mark packets from the laptop computer 310 with the packet ID.

The gateway 330 may receive the transmission 355, from the DNS server 340, which may comprise the packet ID. A user device may transmit a DNS query for a known threat domain, and the gateway 330 may tag all or a portion of packets, transmitted from the user device, with the packet ID. The tagging may comprise marking the packets with a warning that may alert an upstream router that the packets originated at a suspicious client device. For example, if the laptop computer 310 transmits a DNS query for a known threat domain, the gateway 330 may tag all or a portion of packets transmitted from the laptop computer 310 with the packet ID. By doing so, the policy manager may not have to continuously inspect each packet to determine that it is suspicious. The gateway 330 may mark the packets with a virtual local area network (VLAN) tag, an Encap header, an IPv6 Flow Label, and/or a DSCP marking. The packet ID may be different for different client devices or the packet ID may be the same for different client devices (e.g., a one size fits all indication that the packet is suspicious). The tagging may alert an upstream router that the packets are suspicious, and may facilitate the rerouting of the packets for further analysis, or a quarantine of the client device at which the packets originated.

After receiving a response to the DNS query comprising the transmission 335, the computing device that transmitted the DNS query may send a transmission to the gateway 330. For example, the transmission may comprise a request for a webpage or other content, and the destination may be a network address, such as an IP address received from the DNS server 340.

The gateway 330 may receive the transmission comprising the request, and may forward a transmission 375 to a router 370. If the gateway 330 received the request from a compromised computing device, the gateway 330 may tag the request with a packet ID. The transmission 375 may comprise a tagged packet.

The router 370 may receive the transmission 375 from the gateway 330. For example, the transmission 375 may comprise a request, from a gateway 330, for video content. The router 370 may also receive the transmission 375 comprising a request to establish an internet video conference session. The transmission 375 may comprise a request for a web page. The transmission 375 may comprise one or more packets. The transmission 375 may also comprise a user device token, generated by the gateway 330 that identifies both the gateway 330, and the user device associated with the query.

The router 370 may determine whether the transmission 375 is tagged with a packet ID. For example, the packet may be tagged with a VLAN tag, a DSCP marking, an IPv6 Flow Label, and/or an IP encapsulation header. Based on the packet ID, the router 370 may determine that the transmission 375 originated from a compromised computing device. If the transmission 375 comprises a packet ID, the router 370 may forward the transmission 375 to a packet analyzer for further analysis. The router 370 may forward the transmission 375 to the threat analyzer. The router 370 may also send the original packet to the internet. Actions performed by the router 370 are further described below with regards to FIG. 6.

Figure 4:
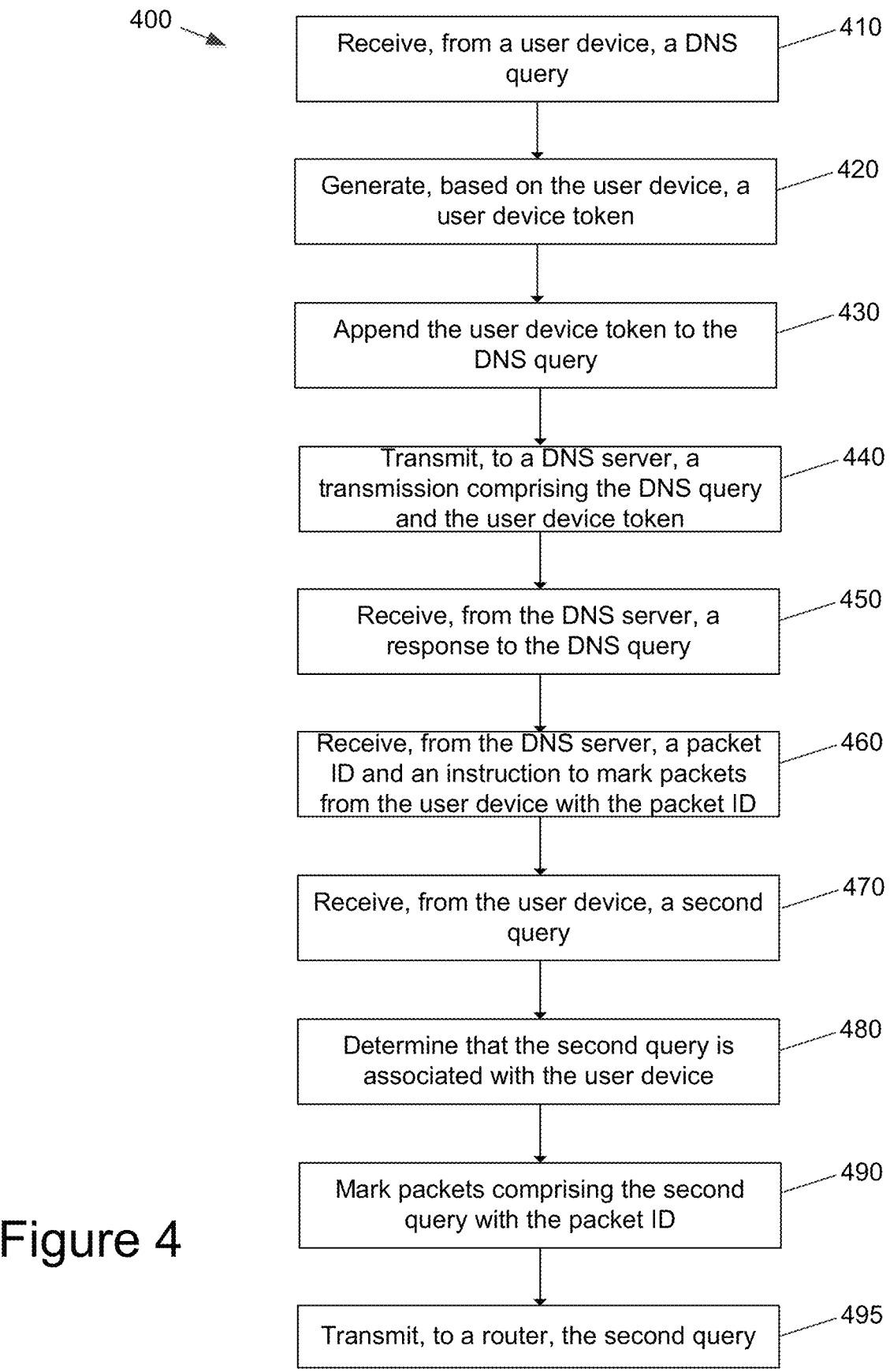
FIG. 4 is a flow diagram of a method for marking queries from a compromised computing device according to aspects of the disclosure.

FIG. 4 is a flow diagram of a method 400 for marking queries from a compromised computing device according to aspects of the disclosure. In one or more embodiments, the method 400 or one or more steps thereof may be performed by one or more computing devices or entities. For example, portions of the method 400 may be performed by components of the network 100 or the computing device 200. The method 400 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 410, a gateway, such as the gateway 330 may receive a DNS query from a user device. The user device may comprise, for example, the laptop computer 310 or the mobile device 320. For example, a user may be using a computer, such as the laptop computer 310, to access an Internet page, and may have just entered a textual URL. For example, a user may request, via a browser on the laptop computer 310, the COMCAST™ website. The laptop computer 310 may send a DNS query to the gateway 330, which may translate the textual URL into an IP address for the COMCAST™ website.

The gateway 330 may be associated with, e.g., in communication with, a plurality of computing devices. For example, the gateway 330 may comprise the gateway interface device 111, a reference design kit for broadband (RDK-B) based device, or a router. The gateway 330 may comprise a router and/or access point in communication with a laptop computer and a mobile device, such as the laptop computer 310 and the mobile device 320 respectively. The gateway 330 may send and receive transmissions to and from one or more computing devices that are associated with the gateway 330. For example, the gateway 330 may receive a transmission from a display device, a set top box, or a personal computer, such as the display device 112, the set top box 113, and the personal computer 114 respectively. The gateway 330 may receive a DNS query, such as the DNS queries 315 and 325, from a laptop computer or a mobile device, such as the laptop computer 310 and mobile device 320 respectively.

At step 420, the gateway 330 may generate a user device token which, as will be explained further below, may be used to identify a client device. The gateway 330 may comprise a DNS forwarder, for communicating with a DNS server 340. The DNS forwarder may comprise a part of the gateway 330 that handles a particular subset of queries. The particular subset of queries may comprise a specific plurality of external addresses, or a specific plurality of internal addresses. The DNS forwarder may then send the queries on to a DNS server. The gateway 330 may generate, using the DNS forwarder and based on a user device associated with the DNS query, a user device token. The gateway 330 may generate the user device token by combining identification information of the gateway 330 with identification information of the computing device that transmitted the DNS request. For example, the laptop computer 310 may transmit a DNS query 315 to the gateway 330. The DNS forwarder in the gateway 330 may generate a user device token, associated with the laptop computer 310 and the gateway 330, to be transmitted to the DNS server 340 along with the DNS query via transmission 335. The user device token may comprise a Media Access Control (MAC)-address and a wide area network (WAN) (internet protocol) IP address associated with the gateway 330, and a user device ID and a local IP address associated with a client device. For example, the user device token may comprise "ExampleWANIPaddress-ExampleLocalIPAddress." Using a MAC-address and/or a user device ID, such as a client device hostname or one-way hash of MAC-address, may make the user device token harder to hack. For example, a predictive hashing function may be used so that the user device token remains constant. The gateway 330 may perform a hashing function on a combination of a randomly generated nonce and the MAC-address. As a result, a hacker may have difficulty altering the user device token and/or concealing the origin of a request. This may also protect against phishing attacks where a request or query may be sent from a first computing device, and then bounced around between multiple additional computing devices before transmitting the query to, for example, a DNS server. Using values that change over time, such as an IP address, in the user device token may have advantages as well. For example, because the values may be changing over time, they may be more difficult for a hacker to accurately replicate.

The user device token may also comprise a user identifier such as a user name. This may comprise a level of security beyond the client device identifier. This may allow the DNS server to determine that a bad actor may one or more users of a specific computing device. For example, a first user of the laptop computer 310 may often visit suspicious websites, and two other users of the laptop computer may not. By distinguishing between requests from the three users of the laptop computer 310, the gateway 330 may be able to mark packets in subsequent requests from the laptop computer associated with the first user. This feature may be advantageous for implementing a parental control. For example, a parent may be able to isolate a child from accessing the Internet by instructing the gateway 330 to tag requests associated with the child's actions on a home computer.

The user device token may also comprise a program identifier, such as a program name. The gateway 330 may apply a hashing function to a combination of the MAC-address, an IP address, and the program name. This may comprise a level of security beyond the user identifier. For example, this may allow the DNS server to determine that suspicious queries may originate at a certain client device, when a certain user is using the client device, and when a certain program or a certain combination of programs is running on the client device. For example, the DNS server may receive a plurality of suspicious requests when a certain video game is running. By distinguishing between requests from a computing device when the video game is and is not running, the gateway 330 may be able to mark packets in subsequent requests from the client device when the video game is running, but might not mark packets from the client device when, for example, only a word processing program or an accounting program is running.

The gateway 330 may encrypt the user device token for additional security via a one-way hash function. After generating the user device token, the gateway 330 may store the user device token for use with future DNS queries. The gateway 330 may maintain a table associating user device tokens with their respective user devices. For example, the table may associate "ExampleWANIPaddress-ExampleLocalIPAddress" with the laptop computer 310.

At step 430, the gateway 330 may append, prior to sending a transmission such as the transmission 335, the user device token to the DNS query. For example, the DNS query 315 may comprise a DNS query, from the laptop computer 310, requesting an IP address associated with a textual domain name such as "www.comcast.com." The gateway 330 may append a user device token, such as "ExampleWANIPaddress-ExampleLocalIPAddress" to the DNS query. The result may comprise "ExampleWANIPaddress-ExampleLocalIPAddress-DNSQuery." Placement of the token in the DNS query may comprise part of the OPT in the DNS query. For example, before the gateway 330 appends the token, the DNS query may comprise:

Queries
    www.google.com: type A, class IN
        Name: www.google.com
        Type: A (Host address)
        Class: IN (0x0001)

After the gateway 330 appends the token via Option EDNS0, the result may comprise:

Queries
    www.google.com: type A, class IN
        Name: www.google.com
        Type: A (Host address)
        Class: IN (0x0001)
        Type: OPT (EDNS0 option)
        EDNS0 version 0
        Data: <User Device Token>

The gateway 330 may append the user device token to the DNS query using a method such as EDNS0 OPT RR (Extension Mechanism for Domain Name Services Option Resource Records).

At step 440, the gateway 330, and may transmit, to the DNS server 340, the user device token and the DNS query. The gateway 330 may transmit, to the DNS server 340, the transmission 335. For example, a user may request, via a browser on the laptop computer 310, the COMCAST™ website. The transmission 335 may comprise "ExampleWANIPaddress-ExampleLocalIPAddress" and the DNS query requesting the IP address associated with "www.comcast.com."

At step 450, the gateway 330 may receive, from the DNS server 340, a response to the DNS query via the transmission 345. The gateway 330 may receive an IP address associated with the DNS query. If the DNS query comprised a request for the IP address associated with "www.comcast.com," the gateway 330 may receive, from the DNS server 340, 69.252.80.75 (the IP address corresponding to www.comcast.com). This may allow the user to begin browsing the COMCAST™ website.

At step 460, the gateway 330 may receive, from the DNS server 340, a packet ID and an instruction to mark packets from the user device with the packet ID. For example, the DNS server 340 may determine that the DNS query comprising the transmission 335 may be suspicious. As a result, the gateway 330 may receive the transmission 355, comprising an instruction to mark subsequent requests from the user device. The DNS server 340 may have analyzed the DNS query to determine whether the DNS query comprised a potential threat. The DNS server 340 may have determined that the user device is possibly infected with malware, and may have sent the transmission 355 to the gateway 330. This process is described further below with regards to FIG. 5.

The packet ID may comprise a virtual local area network (VLAN) tag, a differentiated services code point (DSCP), an IPv6 Flow Label, and/or an IP encapsulation (Encap) header. As a result, the packet ID may comprise both an identifier of the user device at which the request originated and a flag indicating that the request is suspicious. As a result, the router 370 may use the packet ID to apply policy. For example, the router 370 may apply the same policy to multiple devices as long as the packet IDs are the same. The gateway 330 may store the packet ID in a database that associates the packet ID with the user device token. For example, the gateway 330 may receive an instruction from the DNS server 340 to tag all packets, from the laptop computer 310, with an IP encapsulation header. The gateway 330 may store an association between the IP encapsulation header and the laptop computer 310 user device token. This may allow the gateway 330 to keep track of bad actors, and to mark subsequent requests from them in the future. For example, the gateway 330 may receive instructions to mark subsequent packets from an infected laptop computer with the packet ID.

At step 470, the gateway 330 may receive, from the user device, a second query. Once the DNS server 340 has flagged a potentially suspicious computing device, the gateway 330 may flag all requests from the potentially suspicious computing device. Thus, the second query may not be limited to a DNS query. For example, the second query may comprise a different type of request, such as a request for video content or a request to establish a video conference session.

At step 480, the gateway 330 may determine the user device associated with the second request. For example, the gateway 330 may identify a local IP address associated with the user device, and may determine that the gateway 330 previously generated the user device token "ExampleWANIPaddress-ExampleLocalIPAddress" at, for example, step 420. The gateway 330 may consult the database, and may determine, based on the user device token, that the gateway 330 previously received an instruction, via the transmission 355, to tag future queries from the user device with a packet ID. The gateway 330 may consult the database that stores user device tokens and associated packet IDs. Based on the user device associated with the second request, the gateway 330 may determine a packet ID with which to mark packets comprising the second request. The packet ID may comprise, for example, the IP encapsulation header described above with regards to step 460.

At step 490, the gateway 330 may mark, with the packet ID, the packets comprising the second query. As described above, the gateway 330 may mark, with the IP encapsulation header, all packets comprising the second query. While the gateway 330 may append the user device token to one or more queries, the gateway 330 may insert, into the one or more queries, the packet ID. For example, the marking may occupy a general use field associated with the packet. Before the packet ID is inserted by the gateway 330, the query may comprise:

SRC-IP: 10.0.0.10
    DST-IP: 123.123.123.123
    DSCP: UNSET
    Payload

Once the gateway 330 inserts the packet ID into the query, the query may comprise:
SRC-IP: 10.0.0.10
DST-IP: 123.123.123.123
DSCP: AF43
Payload By marking packets with, for example, the IP encapsulation header, the gateway 330 may facilitate the routing of the packets by, for example, an upstream router, such as the router 370. The router 370 may determine, based on the presence of a packet ID, and without analysis of the user device token and query by the threat analyzer, which requests to deny or to route for further analysis.

At step 495, the gateway 330 may transmit, to a router, such as the router 370, the second query. The router may be located upstream from the gateway 330. The router may be the same router that facilitated processing of the DNS query. The gateway 330 may also append, to the second query and prior to sending the second query, the user device token. This may allow the threat analyzer to perform analysis on the second query, and to identify a client device at which the second query originated, if the second query is denied by the router 370. Based on analysis of subsequent queries from a suspicious client device, the gateway 330 may continue to mark all packets originating at the suspicious client device, to mark a portion of all packets originating at the suspicious client device, or to stop marking packing originating at the suspicious client device. The router may implement network policy based on the marking and the user device token. Actions performed by the router may be described further below with regards to FIG. 6.

Figure 5:
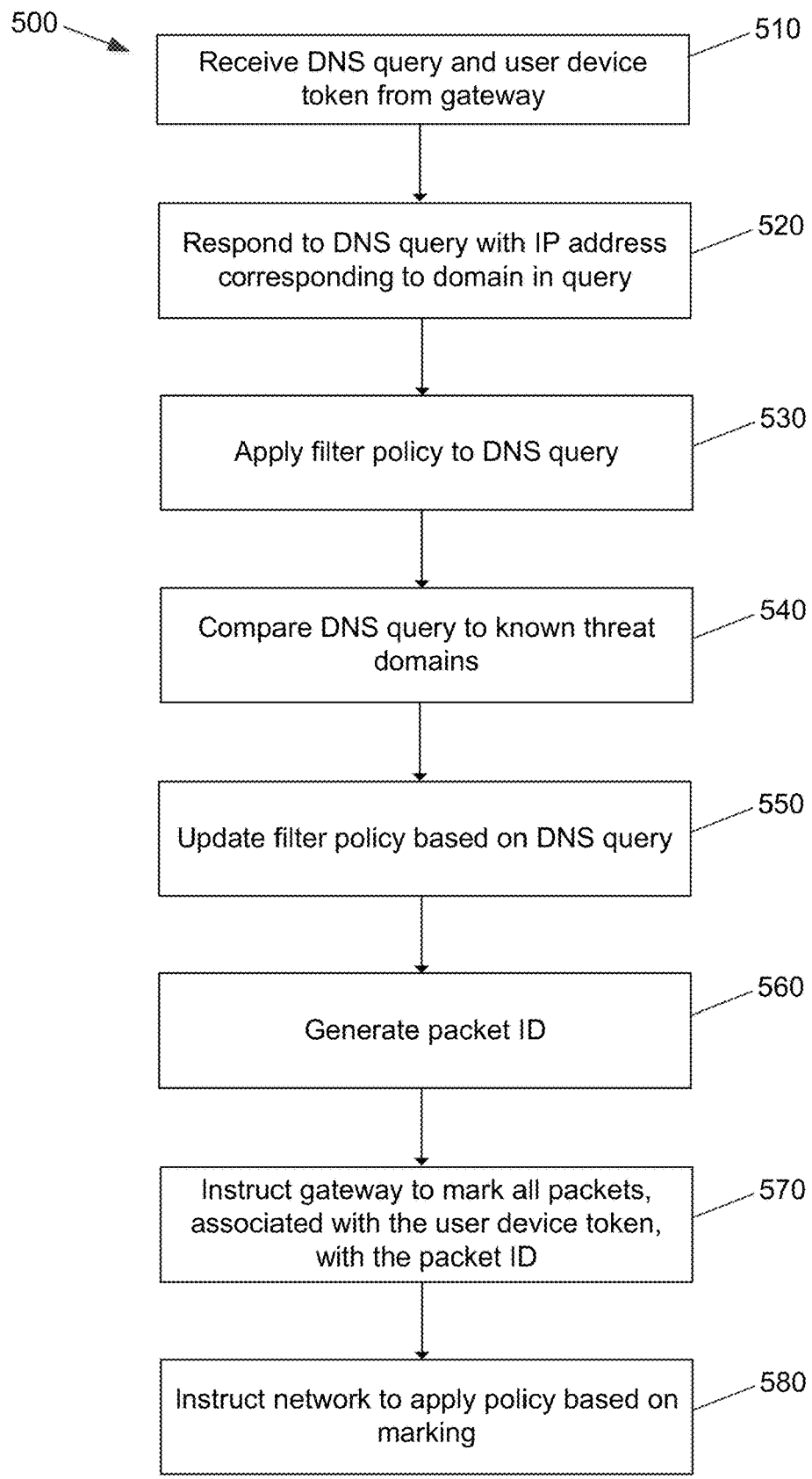
FIG. 5 is a flow diagram of a method for identifying a compromised computing device according to aspects of the disclosure.

FIG. 5 is a flow diagram of a method 500 for identifying a compromised computing device according to aspects of the disclosure. While FIG. 4 showed interactions between a gateway and a DNS server from the gateway perspective, FIG. 5 shows the interactions between the gateway and the DNS server from the DNS server perspective. In one or more embodiments, the method 500 or one or more steps thereof may be performed by one or more computing devices or entities. For example, portions of the method 500 may be performed by components of the network 100 or the computing device 200. The method 500 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 510, a DNS server, such as the DNS server 340, may receive a DNS query, such as the DNS query comprising the transmission 335, and a user device token. This DNS query may be the DNS query sent from the gateway 330 described above at step 440. The DNS server 340 may receive the DNS query from the gateway 330. The user device token may comprise, for example, a Media Access Control (MAC)-address and a wide area network (WAN) (internet protocol) IP address associated with a gateway, such as the gateway 330, and a user device ID and a local IP address associated with a client device, such as the laptop computer 310 or the mobile device 320. For example, a user may open a browser on a laptop computer, such as the laptop computer 115, and may make a request for a website. A DNS forwarder, in the gateway 330, may generate the user device token. The DNS forwarder may comprise a part of the gateway that handles a particular subset of queries. The particular subset of queries may comprise a specific plurality of external addresses, or a specific plurality of internal addresses. The user device token may comprise one or more of: the gateway Media Access Control (MAC)-address, the gateway Wide Area Network (WAN) Internet Protocol (IP) address, the user device ID, and the local IP address of the user device. The DNS forwarder may then send the queries and user device tokens on to a DNS server 340.

At step 520, the DNS server 340 may transmit, to the gateway 330, a response to the DNS query, such as the response comprising the transmission 345. This response may comprise the response to the DNS query, received from the DNS server 340, described at step 450. The DNS server 340 may respond to the DNS query by resolving a domain name corresponding to the DNS query and then transmitting the response comprising an IP address corresponding to the domain name. For example, a user may open a browser, and may type "www.comcast.com." The DNS server 340 may respond by transmitting 69.252.80.75, the IP address corresponding to "www.comcast.com," to the gateway 330. The user may then wish to access a different website, such GOOGLE™. The user may type "www.google.com" in the browser. The DNS server 340 may respond by transmitting 8.35.80.49, the IP address corresponding to "www.google.com," to the gateway 330.

The DNS server 340 may respond to the DNS query with a correct IP address without waiting for completion of malware-detection analysis, by the threat analyzer, on the DNS query. In doing so, the DNS server 340 allows the user to view the requested website without imposing, on the user, a delay in response due to the analysis of the DNS query. The response may comprise an IP address associated with a domain name received from the gateway 330. The response may comprise a time to live (TTL) value. The TTL value may be a TTL for an IP address transmitted in the response. The TTL value may limit the lifespan of the IP address as related to the DNS query. The TTL value may comprise a timestamp embedded in the response. Once the TTL expires, the gateway 330 may prompt the client device for a second DNS query requesting an IP address associated with the domain name. The DNS server may use TTL to improve performance for caching and/or to increase privacy and security associated with the domain names.

At step 530, the DNS server 340 may determine that the DNS query comprises a potential threat. The DNS server 340 may comprise a threat analyzer, as described above with regards to FIG. 3, which may determine that the DNS query comprises a potential threat. For example, the threat analyzer may compare a URL in the DNS query against a list of URLs, stored by the threat analyzer, that the threat analyzer and/or other clearing houses previously identified as being associated with malware. The threat analyzer may be an offline threat analyzer, separate from the DNS server 340. The DNS server 340 may also comprise a policy manager, as described above with regards to FIG. 3. The policy manager may comprise a logical component that may coexist in the DNS server. The DNS server 340 may run the DNS query and user device token through the policy manager to determine whether the DNS query should be analyzed by the threat analyzer. For example, the policy manager may analyze the user device token comprising a local IP address of the user device and may evaluate the local IP address to identify the user device at which the DNS query originated. If the user device has been flagged as potentially compromised, the policy manager may route the DNS query to the threat analyzer. The policy manager may route the DNS query to the threat analyzer based on a filter policy and information contained in the user device token such as the gateway Media Access Control (MAC)-address, the gateway Wide Area Network (WAN) Internet Protocol (IP) address, the user device ID, and the local IP address of the user device.

The DNS server 340 may apply a separate filter policy for each user device. For example, the policy manager may route a first number of DNS queries from the laptop computer 115, and may route a second number of DNS queries from the personal computer 114. The different filter policies may be determined based on a quantity of malware requests received. For example, the DNS server 340 may currently send half of the requests, received from the laptop computer 115, to the threat analyzer for further analysis. If the DNS server 340 determines that a number of requests comprising malware requests, from the laptop computer 115, exceeds a predetermined threshold, the DNS server 340 may implement a filter policy indicating that 90% of requests received from the laptop computer 115 should be routed to the threat analyzer. If the DNS server 340 determines that a number requests, from the personal computer 114, that comprise malware requests falls short of the predetermined threshold, the DNS server 340 may implement a filter policy indicating that 20% of requests received from the personal computer 114 should be routed to the threat analyzer.

At step 540, the DNS server 340 may analyze the query comprising the transmission 335. If the policy manager indicates that, based on filter policy, the query should be analyzed, the DNS server 340 may use the threat analyzer to analyze the DNS query to determine if it comprises a malware request. The threat analyzer may comprise a database stored on the DNS server 340, or an offline element such as a database of DNS data associated with a network. The threat analyzer may gather DNS data from the network to analyze and detect possible threats. The threat analyzer may compare the domain name in the DNS query to one or more lists of domain names. In doing so, the threat analyzer may determine that the domain name associated with the DNS query may be a blacklisted domain name. The domain name in the DNS query may be compared to one or more lists of domain names associated with malware, such as domain names that are used for transmitting instructions to malware and/or receiving data from malware. The threat analyzer may determine that the domain name in the DNS query comprises a textual domain name that matches a known threat domain. For example, a known threat domain may comprise a website associated with malware. The threat domain may also comprise a server that malware is configured to communicate with in order to obtain instructions. The one or more lists of domain names associated with malware may comprise an aggregate of one or more threat lists from varies providers or clearing houses (such as EAMBALLA™ and NOMINUM™). These providers may compile lists of known threat domain names. The threat analyzer may aggregate a first list from a first clearing house, with a second list from a second clearing house, resulting in a third list. The threat analyzer may then compare the DNS query to the third list. The threat analyzer may also gather information associated with the DNS query, such as time of day, frequency, IP address, and domain, and may cross-reference the information against a heuristic database containing queries made by other user devices to determine whether the domain name, comprising the DNS query, matches a known threat domain. The threat analyzer may update, based on its analysis of the DNS query, the heuristic database. The threat analyzer may update the heuristic database to include the domain, the time, and/or the frequency associated with the DNS query. The DNS server 340 may compare future DNS queries with the information stored in the heuristic database to determine whether the future DNS queries are associated with a known threat domain or with a pattern of known threat domains. The threat analyzer may identify a user device associated with the DNS query based on information in the user device token. For example, the threat analyzer may determine the user device based on one or more of: the gateway Media Access Control (MAC)-address, the gateway Wide Area Network (WAN) Internet Protocol (IP) address, the user device ID, and the local IP address of the user device. In doing so, the threat analyzer may determine that the DNS query originated at, for example, the laptop computer 310. The threat analyzer may determine that the laptop computer 310 previously transmitted another DNS query that comprised a known threat domain, and that the laptop computer 310 may be compromised.

At step 550, the DNS server 340 may update the filter policy. For example, the DNS server 340 may adjust a value indicating a percentage of requests that should be forwarded, from the client device at which the DNS query originated to the threat analyzer. The DNS server 340 may reduce, maintain, or increase the value indicating the percentage of requests to be further analyzed by the threat analyzer. The filter policy may be updated based on the determination of the threat analyzer. For example, the DNS server 340 may determine that the DNS query, comprising the transmission 335, is associated with a known threat domain. The DNS server 340 may identify, via a MAC-address included in the user device token associated with the transmission 335, the gateway 330 associated with the transmission 335. The DNS server may also identify, via a local IP address included in the user device token associated with the transmission 335, the compromised computing device associated with the DNS query comprising the transmission 335. The DNS server 340 may store, at the DNS server 340, the filter policy associated with each of a plurality of client devices. For example, the DNS server 340 may store an association between a percentage of requests to be further analyzed and each potentially suspicious client device. As an example, if the DNS server 340 determines that 90% of the requests from the client device should be forwarded to the threat analyzer, the DNS server 340 may forward nine out of every ten requests received from the client device.

The DNS server 340 may determine different filter policies based on a quantity of malware requests received. For example, the DNS server 340 may have detected a malware request in four of the last five DNS queries associated with the laptop computer 115. Based on the percentage of DNS queries associated with known threat domains (the percentage exceeds a predetermined threshold), the DNS server may update the filter policy to request analysis of more DNS queries, received from the laptop computer 115. The DNS server 340 may increase the percentage of DNS queries, associated with the MAC-address of the gateway and/or the local IP address of the compromised computing device, to be analyzed.

The filter policy for each user device may update dynamically. For example, the policy manager may currently route 20% of all requests, from the laptop computer 115, to the threat analyzer for further analysis. If the threat analyzer determines that a DNS query from the laptop computer 115 corresponds to a malware request, the policy manager may update the filter policy for the laptop computer 115. For example, if a policy manager determines that requests from the laptop computer 115 have corresponded to malware more than a predetermined threshold amount of times, such as more than one of the last five requests, then the policy manager may determine to increase a frequency with which subsequent requests are selected for further analysis by the threat analyzer. For example, the policy manager may increase an amount of requests, from the laptop computer 115, routed to the threat analyzer, from 20% (current filter policy) to 40% (updated filter policy). If the threat analyzer determines that a DNS query from the laptop computer 115 does not correspond to a malware request, the policy manager may update the filter policy for the laptop computer 115. For example, if the policy manager determines that requests from the laptop computer 115 have corresponded to malware less than a predetermined threshold amount of times, such as less than one of the last five requests, then the DNS server may determine to decrease a frequency with which subsequent requests are selected for further analysis by the threat analyzer. For example, this means that the policy manager may decrease an amount of requests, from the laptop computer 115, routed to the threat analyzer, from 20% (current filter policy) to 10% (updated filter policy).

At step 560, the DNS server 340 may generate a packet ID which may be used by the gateway 330 to mark packets comprising requests originating a suspicious computing device. For example, the packet ID may comprise the packet ID received above, by the gateway 330, at step 460.

A policy enforcement manager, comprising the DNS server 340, may determine, based on the user device token, that the request is associated with a compromised computing device. The policy enforcement manager may generate a packet ID and may assign the packet ID to the user device token and/or the computing device (e.g., laptop computer 310) that originally transmitted the DNS query comprising the transmission 335. For example, the policy enforcement manager may generate a packet ID associated with the laptop computer 310 or the mobile device 320. DNS server may transmit the packet ID to the gateway 330 via a transmission 355. The packet ID may comprise a virtual local area network (VLAN) tag, a differentiated services code point (DSCP) and/or an IP encapsulation (Encap) header. For example, if the laptop computer 310 transmits a DNS query for a known threat domain, the DNS server 340 may transmit, to the gateway 330, a packet ID corresponding to the laptop computer 310 and generated by the policy enforcement manager. The DNS server 340 may instruct, via the transmission 355, the gateway 330 to mark packets from the laptop computer 310 with the packet ID.

At step 570, the DNS server 340 may transmit, to the gateway 330 and via the transmission 355, an instruction to mark packets from the user device, determined at step 540 to be infected with malware. This instruction may be the instruction received, by the gateway 330 at step 460. After receiving the indication that the user device may be infected, the policy enforcement manager may generate a packet ID with which the gateway 330 may mark future packets originating at the user device. The policy enforcement manager may map the packet ID to the user device token. DNS server 340 may maintain, using the policy enforcement manager, an identification map detailing which packet ID corresponds to which user device token. The marking may allow a router to redirect future packets originating at the user device. The policy enforcement manager may instruct the router to send packets, tagged with the packet ID, to the threat analyzer. Once routed to the threat analyzer, the packets may undergo analysis similar to that described above at step 540.

For example, the DNS server 340 may instruct the gateway 330 to mark packets from a laptop computer or a mobile device that has been infected with malware. The instruction may comprise an instruction to mark all or a portion of the packets originating at the user device. The policy enforcement manager may instruct the gateway 330 to mark packets from the user device until the gateway 330 receives, from the policy enforcement manager, a second instruction comprising an instruction to stop marking packets from the user device. The policy enforcement manager may send this second instruction in response to receiving a command, from the threat analyzer, to stop marking packets from the user device. For example, as described above at step 550, if the policy manager determines that requests from the laptop computer 115 have corresponded to malware less than a predetermined threshold amount of times, such as less than one of the last five requests, then the DNS server 340 may determine to decrease a frequency with which subsequent requests are selected for further analysis by the threat analyzer. For example, this means that the policy manager may decrease an amount of requests, from the laptop computer 115, routed to the threat analyzer, from 20% (current filter policy) to 10% (updated filter policy). If the policy manager determines that requests from the laptop computer 115 have corresponded to malware less than a second predetermined threshold amount of times, such as less than one of the last twenty requests, then the DNS server 340, may determine to stop marking packets originating at the laptop computer 115. For example, by staying below the second predetermined threshold, the laptop computer 115 may indicate to the DNS server 340 that it is not likely infected with malware. The gateway 330 may also comprise an integrated timer. After expiration of a predetermined time interval, the gateway 330 may stop marking packets from the user device. The integrated timer may be configurable.

At step 580, the DNS server 340 may instruct the network to apply policy based on the marking. For example, DNS server 340 may instruct the network to perform one or more of: decrease, based on the markings, upstream speed from the user device; limit bandwidth of the user device; and transmit, to the user, a notification that the user device is infected. The DNS server 340 may instruct the gateway 330 to prompt the user to initiate, download, and/or install anti-virus software. The DNS server 340 may also instruct a router, such as the router 370, to quarantine the user device by preventing the user device from accessing the internet or other computing devices associated with the router.

Figure 6:
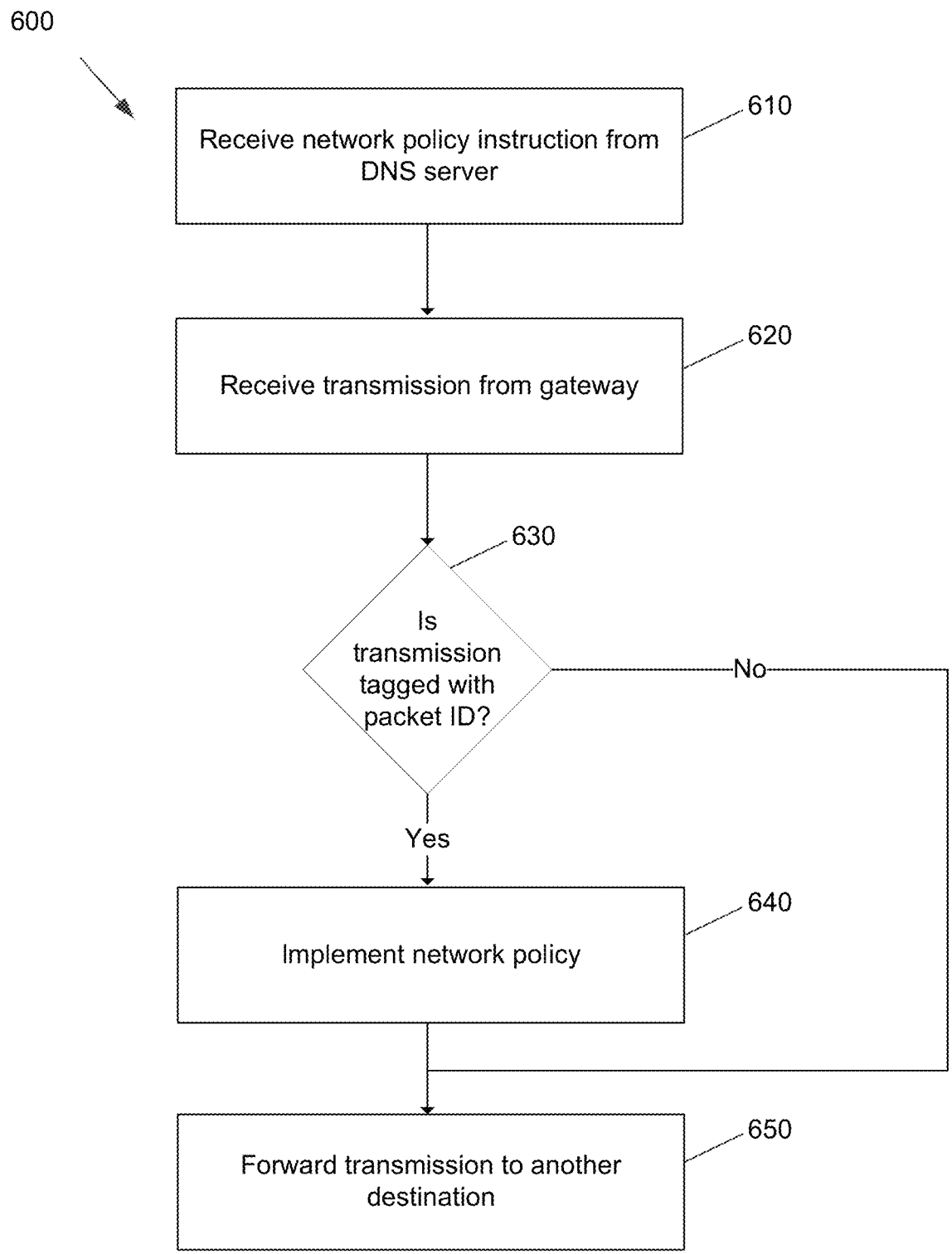
FIG. 6 is a flow diagram of a method for redirecting packets associated with a potentially compromised user device according to aspects of the disclosure.

FIG. 6 is a flow diagram of a method 600 for redirecting packets associated with a potentially compromised user device according to aspects of the disclosure. For example, an upstream router may identify that a request originated at a potentially suspicious device based on marked packets comprising the request, and may redirect the request for further analysis by a threat analyzer. The request may be a subsequent request to the DNS request described above in the methods 400 and 500. In one or more embodiments, the method 600 or one or more steps thereof may be performed by one or more computing devices or entities. For example, portions of the method 600 may be performed by components of the network 100 or the computing device 200. The method 600 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 610, an upstream router, such as the router 370, may receive a network policy instruction from a DNS server, such as the DNS server 340. This network policy instruction may be the instruction sent by the DNS server 340 at step

580. The router may receive the instruction between when the gateway 330 receives an instruction to mark packets comprising subsequent requests and when the gateway 330 transmits a second query (between steps 460 and 495 as described by the method 400). For example, the router 370 may receive an instruction to limit bandwidth of the user device. The DNS server 340 may also instruct a router to quarantine the user device by preventing the user device from accessing the internet or other computing devices associated with the router 370. The router may also receive an instruction to transmit packets tagged with the packet ID to a threat analyzer for further analysis.

At step 620, the router 370 may receive, from a gateway such as the gateway 330, a query. This may comprise the second query, sent by the user device at step 495. The query may comprise the transmission 375. For example, the transmission 375 may comprise a request, from a gateway 330, for video content. The transmission 375 may comprise one or more packets. The transmission 375 may also comprise a user device token, generated by the gateway 330 that identifies both the gateway 330, and the user device associated with the query.

At step 630, the router 370 may determine if the packets comprising the transmission 375 are marked. This may comprise determining whether the transmission 375 comprises a packet ID. The packet ID may be anywhere in the transmission 375, such as in one or more packets or packet headers. For example, the router 370 may determine that the transmission 375 is tagged with a DSCP marking associated with a malware request, and the router 370 may send the transmission 375 to the threat analyzer for further analysis. The router may determine that the transmission 375 is not tagged with a DSCP marking associated with a compromised computing device, and the router 370 may forward the transmission 375 to another destination, such as to another router, gatekeeping device, or the internet. If the transmission 375 comprises a packet ID, the method may proceed to step 640. If the transmission 375 does not comprise a packet ID, the method may proceed to step 650.

If the router 370 determines that the packets comprising the transmission 375 are marked, at step 640, the router may implement network policy. For example, the router 370 may determine, based on the presence of the packet ID, that the transmission 375 comprises a subsequent request from a computing device deemed previously, by the DNS server 340, to be infected with malware. The router 370 may route the transmission 375 for further analysis based on the determination that the one or more packets comprising the transmission 375 were tagged. The tagging may indicate that the transmission 375 originated at a compromised computing device. The router 370 may send the transmission 375 to a packet analyzer. The packet analyzer may comprise the threat analyzer described above at step 540. For example, the router 370 may determine, based on the IP encapsulation header comprising the transmission 375, that the transmission 375 may have originated at a compromised computing device. The router 370 may then send the transmission 375 to the packet analyzer for further analysis. The router 370 may route the transmission 375 to the internet prior to analyzing the transmission 375. The router 370 may route all, or a percentage of marked transmissions from a user device to the internet prior to analyzing the transmissions. This may be based on network policy. The network policy may be similar to the filtering described above at step 530. Based on the network policy, the router 370 may quarantine the user device by impeding any packets from the user device from accessing the internet or the rest of the network prior to further analysis of the transmission 375. The router 370 may implement network policy based on the user device token.

At step 650, the transmission 375 may be forwarded to another destination. In certain instances, the transmission 375 that was tagged with a packet ID may be forwarded to the internet, e.g., the requested destination. In other instances, the transmission 375 that was tagged with a packet ID might be forwarded to another router or gatekeeping device.

Figure 7:
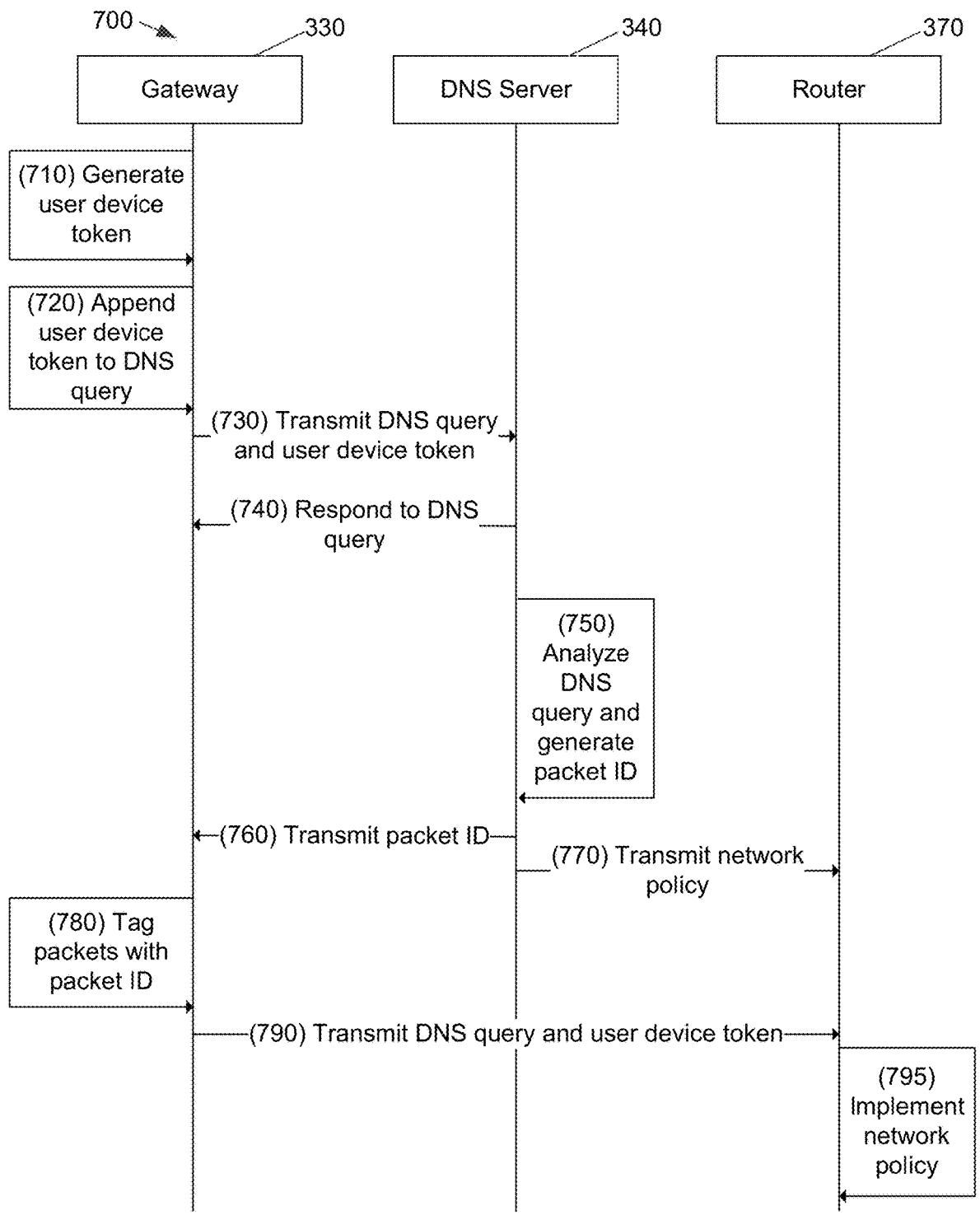
FIG. 7 is a diagram of a method for detecting and identifying a compromised computing device according to aspects of the disclosure.

FIG. 7 is a diagram of a method 700 for detecting and identifying a compromised computing device. FIG. 7 describes the interactions between the gateway 330, the DNS server 340, and the router 370 and shows interplay between the methods 400, 500, and 600. In one or more embodiments, the method 700 or one or more steps thereof may be performed by one or more computing devices or entities. For example, portions of the method 700 may be performed by components of the network 100 or the computing device 200. The method 700 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 710, the gateway 330 may generate a user device token. The gateway 330 may generate, based on a user device associated with a received DNS query, such as the DNS query comprising the transmission 315, the user device token. Step 710 is further described above with regards to step 420. The user device token may be associated with a specific computing device, such as the laptop computer 310. The user device token may be associated with two or more computing devices, such as the laptop computer 310 and the gateway 330. The user device token may comprise an identifier, such as a user device ID or a local IP address for a computing device that is connected to, via a wired or wireless connection, the gateway 330. The gateway 330 may generate the user device token by combining identification information from the gateway 330, such as a MAC-address, WAN IP address, or other identification information of the gateway 330, and identification information from the computing device, such as a user device ID, local IP address, or other unique characteristics of the gateway 330 corresponding to the user device token. As described above at step 420, the user device token may comprise, for example, "ExampleWANIPaddress-ExampleLocalIPAddress." After generating the user device token, the gateway 330 may store the user device token for use with future queries. The gateway 330 may maintain a table associating user device tokens with their respective user devices. For example, the table may associate "ExampleWANIaddress-ExampleLocalIPAddress" with the laptop computer 310.

At step 720, the gateway 330 may append the user device token generated at step 510 to a DNS query. Step 720 is further described above with regards to step 430. For example, the gateway 330 may receive the DNS query from the laptop computer 310, and may append, to the DNS query, a user device token corresponding to the laptop computer 310. The gateway 330 may append the user device token to the DNS query via a DNS forwarder. For example, the gateway 330 may append the user device token "ExampleWANIPaddress-ExampleLocalIPAddress" to the DNS query "www.comcast.com."

At step 730, the gateway 330 may transmit, to the DNS server 340, the DNS query and the user device token. Step

730 is further described above with regards to step 440. The DNS query and the user device token may be transmitted as a single transmission or in multiple transmissions. For example, the gateway 330 may transmit, to the DNS server and prior to sending the user device token, the DNS query. The gateway 330 may transmit, to the DNS server and at the same time, the user device token and the DNS query. If the gateway 330 transmits the DNS query and the user device token as multiple transmissions, the DNS server may have to determine that the user device token is associated with the DNS query. If the gateway 330 transmits the DNS query and the user device token as a single transmission, the DNS server 340 may determine that the DNS query is associated with the user device token because they comprise the same transmission. It may be most efficient to transmit, via a single transmission, the user device token and the DNS query. For example, DNS protocol may define an OPT EDN0 that may be used to carry the token. Multiple transmissions may create a challenge for the DNS server to correlate the DNS query and the user device. A transmission may comprise a piece of data. For example, two sequential pieces of data may comprise two transmissions.

At step 740, the DNS server 340 may respond to the DNS query. Step 740 is further described above with regards to step 520. For example, the DNS server may transmit, to the gateway 330, an IP address that corresponds to a textural URL in the DNS query.

At step 750, the DNS server 340 may analyze the DNS query and generate the packet ID. Step 750 is further described above with regards to steps 530-560. The DNS server 340 may receive, from the gateway 330, the DNS query. The DNS server 340 may apply filter policy to the DNS query. The DNS server 340 may compare the DNS query to known threat domains. The DNS server 340 may update the filter policy based on the DNS query. The DNS server 340 may generate the packet ID.

At step 760, the DNS server 340 may send, to the gateway 330, the packet ID and an instruction to mark all packets, associated with the user device token, with the packet ID. Actions described at step 760 are further described above with regards to step 570.

At step 770, the DNS server 340 may transmit, to the router 370, the network policy. Step 770 is further described above with regards to steps 580. The DNS server 340 may instruct the network to apply policy based on the marking. The DNS server 340 may instruct the router 370 to forward marked packets for further analysis. The DNS server 340 may instruct the router 370 to quarantine the user device by preventing the user device from accessing the internet or other computing devices associated with the router.

At step 780, the gateway 330 may tag, with the packet ID, received at step 760, packets comprising a second query. Step 780 is further described above with regards to steps 470-490. The gateway 330 may receive, from a user device, a second query.

At step 790, the gateway 330 may transmit, to the router 370, the tagged packets and the user device token. Step 790 is further described above with regards to step 495.

At step 795, the router 370 may apply, to the tagged packets, the network policy received at step 770. Actions taken by the router at step 795 are described further above with regards to FIG. 6.

Although example embodiments are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   receiving, by a computing device and from a user device, a domain name system (DNS) query comprising a domain name;
   appending a user device token, comprising information identifying the user device, to the domain name, resulting in a modified DNS query;
   sending, by the computing device and to a DNS server, the modified DNS query; and
   receiving, by the computing device and based on the modified DNS query, an instruction to modify subsequent communications from the user device to include an identifier that indicates the subsequent communications originate from a device potentially infected with malware.

2. The method of claim 1, further comprising:
   receiving a network address requested by the modified DNS query.

3. The method of claim 2, wherein the receiving the network address and the instruction comprises:
   receiving, in a first message, the network address, and
   receiving, in a second message and after the receiving the network address, the instruction.

4. The method of claim 1, wherein the instruction is time limited.

5. The method of claim 1, wherein the instruction indicates a duration between a current time and a time to stop modifying subsequent communications from the user device.

6. The method of claim 1, wherein the instruction comprises a request to modify a percentage of all communications from the user device after the instruction, wherein the percentage comprises less than all of the communications from the user device after the instruction.

7. The method of claim 6, further comprising:
   receiving, from the user device, a second request; and
   receiving, from the DNS server, a second instruction comprising an instruction to modify one or more of: a duration or the percentage.

8. The method of claim 1, wherein the computing device comprises one or more of: a modem, a router, or a combined modem-router.

9. The method of claim 1, further comprising:
   storing, by the computing device and in a table, an association between the user device token and the identifier.

10. The method of claim 1, wherein the identifier comprises one or more of: a differentiated services code point (DSCP) marking, a virtual local area network (VLAN) tag, an internet protocol (IP) encapsulation header, or an IPv6 flow label.

11. The method of claim 1, wherein:
    the user device token comprises a user device identifier and an identifier of the computing device, and
    the user device token is appended to the DNS query via Option EDNS0.

12. The method of claim 1, wherein the receiving the instruction comprises receiving the identifier.

13. The method of claim 1, wherein the identifier is used to reroute subsequent communications for further analysis.

14. The method of claim 1, wherein the identifier is used to quarantine the user device.

15. A method comprising:
receiving, from a first computing device, a domain name system (DNS) query comprising a user device token and a domain name;
parsing the DNS query to identify the user device token and the domain name;
extracting, from the DNS query, the user device token;
sending, to the first computing device, a reply to the DNS query comprising a network address corresponding to the domain name in the DNS query;
analyzing the domain name to determine a potential threat; and
sending, based on a determination that the domain name indicates a potential threat, an instruction to modify subsequent requests from a user device, identified by the user device token, to include an identifier that indicates the subsequent requests originate from a device potentially infected with malware.

16. The method of claim 15, wherein the instruction is time limited and indicates a duration between a current time and a time to stop modifying subsequent requests from the user device.

17. The method of claim 15, wherein the instruction comprises a request to modify a percentage of subsequent requests from the user device.

18. The method of claim 17, further comprising:
determining the percentage based on a ratio of malware requests received from the user device to total requests received from the user device within a predetermined time period.

19. The method of claim 15, further comprising:
sending, to a router upstream from the first computing device, a routing instruction comprising an instruction to perform one or more of: routing modified packets for analysis or quarantining the first computing device.

20. A method comprising:
receiving, by a computing device and based on a domain name system (DNS) query, a network address;
receiving, by the computing device, an instruction to modify subsequent requests from a user device to include an identifier that indicates the subsequent requests originate from a device potentially infected with malware; and
modifying, by the computing device, at least one subsequent request from the user device to include the identifier.

21. The method of claim 20, wherein the instruction to modify subsequent requests comprises a time limit that indicates a duration between a current time and a time to stop modifying subsequent requests from the user device.

22. The method of claim 20, wherein the instruction to modify subsequent requests comprises a request to modify a percentage of all subsequent requests from the user device after the instruction, wherein the percentage comprises less than all of the subsequent requests from the user device after the instruction.

23. The method of claim 20, wherein the modifying subsequent requests from the user device to include the identifier further comprises:
inserting, by the computing device, the identifier in a field of the at least one subsequent request from the user device.

* * * * *

UNITED STATES PATENT AND TRADEMARK OFFICE
CERTIFICATE OF CORRECTION

PATENT NO. : 11,601,466 B2
APPLICATION NO. : 15/703072
DATED : March 7, 2023
INVENTOR(S) : Lee It is certified that error appears in the above-identified patent and that said Letters Patent is hereby corrected as shown below:

In the Specification

Column 3, Detailed Description, Line 2:
Delete "105-07." and insert --105-107.-- therefor Column 3, Detailed Description, Line 26:
Delete "105-07" and insert --105-107-- therefor Column 20, Detailed Description, Lines 53-54:
Delete ""ExampleWANIaddress-ExampleLocalIPAddress""" and insert
--"ExampleWANIPaddress-ExampleLocalIPAddress"-- therefor Signed and Sealed this
Seventh Day of May, 2024

Katherine Kelly Vidal
*Director of the United States Patent and Trademark Office*